Aug. 15, 1933.     F. MARASSO     1,922,856
LOADING APPARATUS FOR PROOFERS
Filed March 28, 1932     3 Sheets-Sheet 1

Inventor:
Fred Marasso,
by Charles O. Shurvey
his Atty.

Aug. 15, 1933.　　　F. MARASSO　　　1,922,856
LOADING APPARATUS FOR PROOFERS
Filed March 28, 1932　　　3 Sheets-Sheet 2
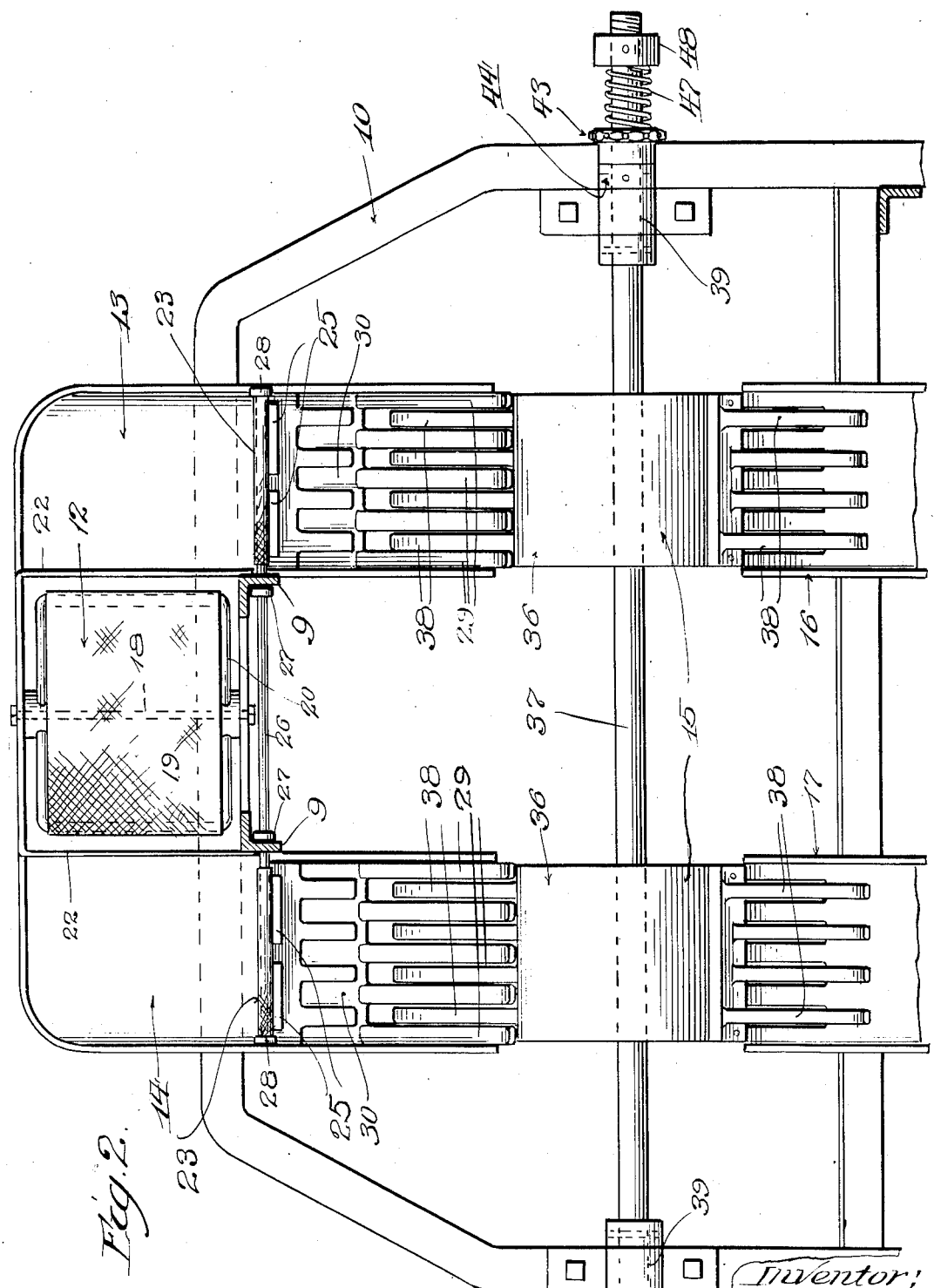

Aug. 15, 1933.　　　　F. MARASSO　　　　1,922,856
LOADING APPARATUS FOR PROOFERS
Filed March 28, 1932　　　3 Sheets-Sheet 3
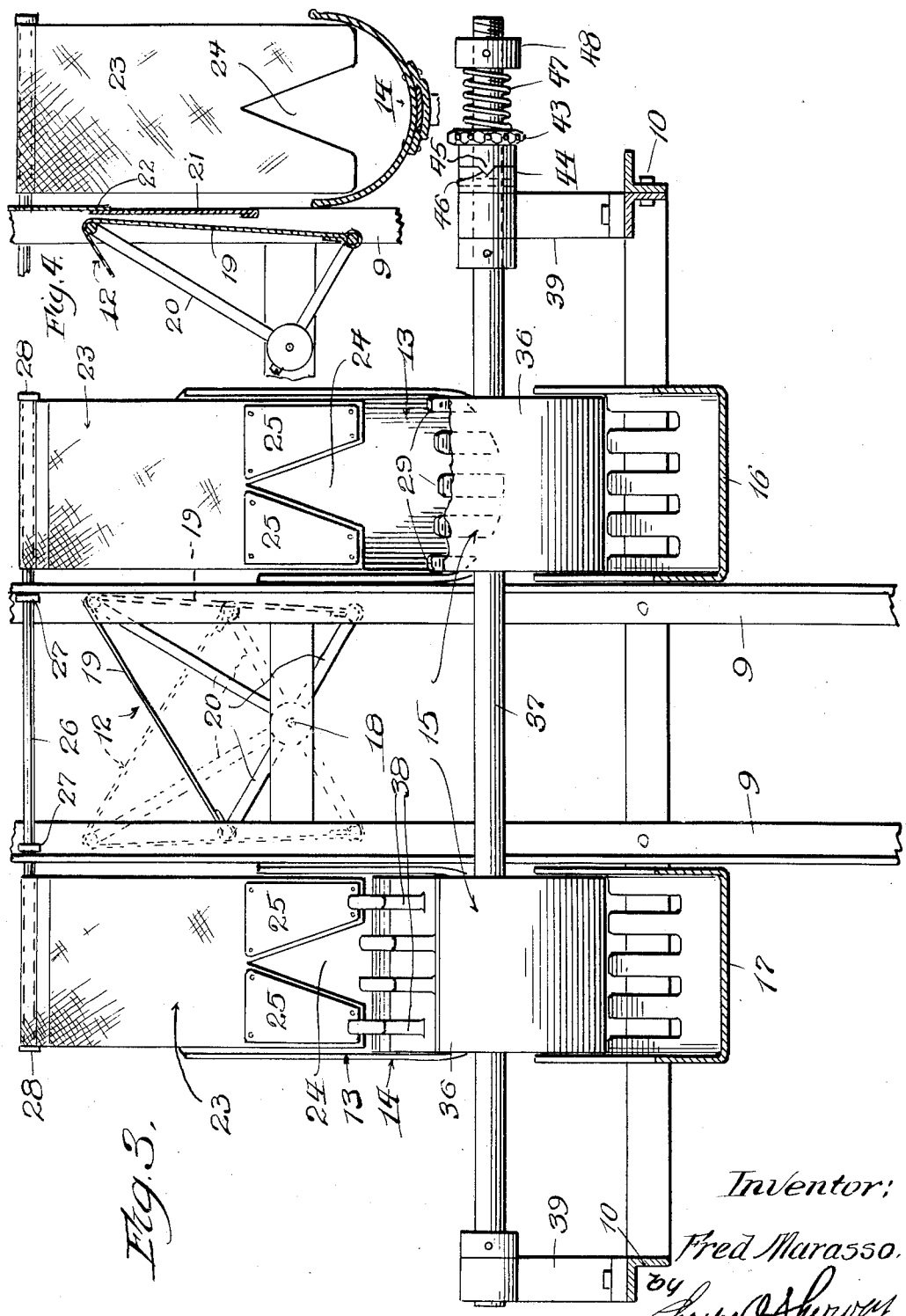

Patented Aug. 15, 1933

1,922,856

UNITED STATES PATENT OFFICE 1,922,856

LOADING APPARATUS FOR PROOFERS

Fred Marasso, Joliet, Ill., assignor to Union Machinery Company, Joliet, Ill., a Corporation of Illinois Application March 28, 1932. Serial No. 601,621

4 Claims. (Cl. 198—31)

This invention relates to loading apparatus for proofers, and one of its objects is to provide novel means for guiding and controlling the movement of the lumps of dough during their passage through the apparatus. Another object is to provide means for automatically stopping the loading mechanism in case of an emergency.

Other objects and advantages will appear in the course of this specification, and with all of said objects and advantages in view, this invention consists in the several novel features of construction, arrangement and combination of parts hereinafter fully set forth and claimed.

The invention is clearly illustrated in the drawings accompanying this specification in which—

Fig. 2 is a view, partly in plan and partly in horizontal section, the line of section being indicated at 2—2 in Fig. 1;

Fig. 3 is a view, partly in elevation and partly in cross section, of the loading mechanism, the line of section being indicated at 3—3 in Fig. 1; and Fig. 4 is a fragmentary vertical cross section taken on the line 4—4 of Fig. 1.

Figure 1:
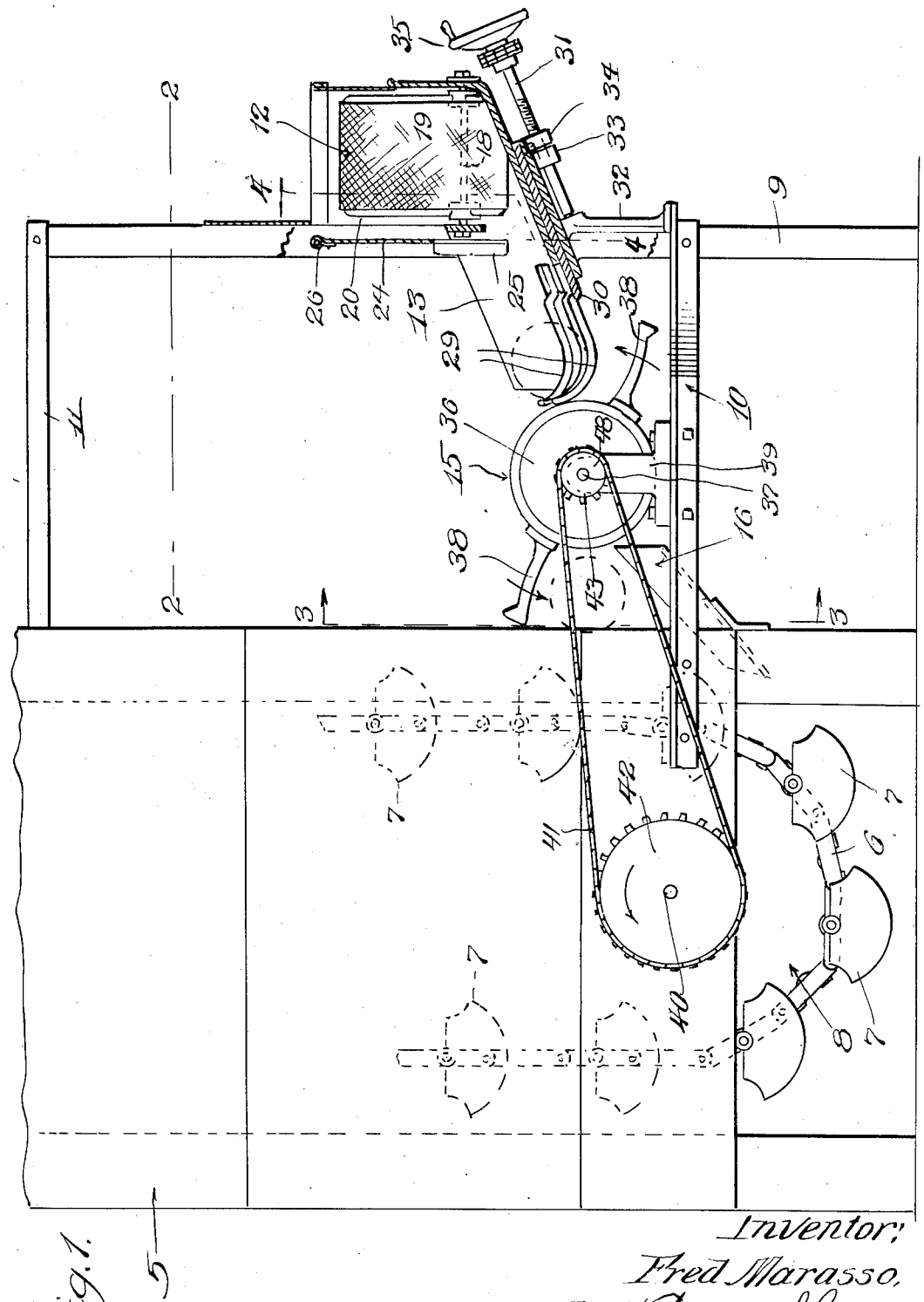
Figure 1 is a side elevation of a fragment of a proofer equipped with loading mechanism embodying a simple form of the present invention, part of the loading mechanism being broken away to show parts which would otherwise be hidden from view.

Referring to said drawings, the reference character 5 designates a fragment of the loading end of a proofer of conventional form in which is comprised an endless chain 6 carrying buckets 7 which receive and convey the lumps of dough through the proofer. The buckets 7 are arranged in pairs, one beside the other, and the loading apparatus is arranged to deposit two lumps of dough at a time into a pair of buckets. At the loading end of the proofer illustrated, the endless chain 6 passes around a sprocket wheel 8 and the lumps of dough are fed to the buckets at this point.

The loading mechanism forming the subject matter of this specification is located adjacent the loading end of the proofer, and, as shown, is carried by a framework consisting of upright bars 9 and horizontal frame members 10 and 11. The horizontal frame members are riveted or otherwise secured to the proofer structure and to the upright bars 9 so as to provide a rigid framework for the loading mechanism.

Adjacent the loading mechanism is the rounder or rounding up machine (not shown) which delivers the lumps of dough, one at a time, to the loading mechanism. Supported by the framework of the loading mechanism underneath the discharge end of the rounder is a distributor 12 which distributes the lumps of dough as they are received from the rounder and directs them towards either of two inclined chutes 13, 14 through which they roll to a transfer mechanism 15 which transfers the lumps of dough from the inclined chutes 13, 14 to other inclined chutes 16, 17 from which they are delivered in pairs to the traveling buckets 7 as the latter pass the discharge end of the inclined chutes 16, 17.

The distributor 12 is tiltably mounted upon a rod 18 supported by the framework of the loading apparatus and is of triangular form, as best seen in Fig. 3, the two sides 19 of the distributor being usually composed of canvas stretched over the framework 20 of the distributor. The distributor normally stands in an inclined position, as shown in Fig. 3, so that when a lump of dough falls upon the canvas side thereof, the lump of dough rolls down into the inclined side, falls into one of the chutes 13, 14, and tilts the distributor into a reverse position, such as is indicated by the dotted lines in Fig. 3, whereupon the other side of the distributor is presented in a position for receiving another lump of dough which is discharged into the other chute.

The inclined chutes 13 and 14 are disposed on each side of the distributor 12 in position to receive the lumps of dough as they discharge from the distributor, and I have provided curtains 21 formed of canvas or the like supported from bars 22 placed adjacent the upper end of the distributor which are adapted to retard slightly the passage of the lumps of dough from the distributor to the inclined chutes 13 and 14.

For the purpose of directing the movement of the lumps of dough down through the center of the inclined chutes 13 and 14, I provide weighted curtains 23 that extend into the chutes 13 and 14, each of which curtain is formed with a cleft 24 in the lower end through which the lumps of dough are free to pass. On the bifurcated parts of the curtains 23 are secured weights 25, here shown in the form of plates riveted or otherwise secured to the curtain, and said weights serve to obstruct in a measure the passage of the lump of dough striking against them, and thus serve to direct the lumps of dough into the free space between the furcations, whereby the lumps of dough may roll down the middle of the chutes.

The curtains 23 are supported from a rod 26 which extends through flanges of the upright bars 9 and is held against endwise movement by collars 27 fastened to the rod 26. The upper end of each curtain is looped around the rod and fastened together to form a hem. Heads 28 upon the ends of the rod prevent the curtains from becoming accidentally detached therefrom.

The chutes 13 and 14 are preferably provided with rounded bottoms, as shown, and the curtains 23 project down into the hollows of the chutes, so that a lump of dough rolling down a chute will encounter one of the furcations, if it happens to be rolling down along one side of the chute, and by reason of the obstruction thus met with, the lump of dough seeks the easiest way down, and, therefore, passes through the cleft between the furcations.

At the lower end of the chutes 13 and 14 are upwardly inclined or curved fingers 29 which are adjustably mounted with respect to the chutes, and the fingers in each chute are preferably formed upon a plate 30 which is guided in ways on the underside of the chute. An adjustment screw 31 rotatably mounted in brackets 32 and 33, and threadedly engaging in a lug 34, depending from the plate 30, and a hand wheel 35 on the end of the screw, provide means for adjusting the fingers 29 in the chute. When relatively small lumps of dough are being handled, the fingers 29 are moved back into the chutes so as to prevent more than one lump of dough at a time from being taken out of the chute by the transfer mechanism, as will be presently explained.

The transfer mechanism is located between the chutes 13—14 and 16—17 and comprises drums 36 mounted on a shaft 37, and provided with radially extending fingers 38, which pass between the fingers 29 of the chutes 13 and 14, pick up the lumps of dough from said chutes and drop them upon the chutes 16 and 17 through which they roll into the buckets 7. The chutes 16 and 17 are slotted, as shown in Figs. 2 and 3, to permit the fingers 38 to pass through the chutes. The shaft 37 is journaled in bearing brackets 39 mounted upon the horizontal frame member 10 and is driven from the shaft 40 which carries the gear wheel 8 by a sprocket chain 41 trained around sprocket wheels 42 and 43 mounted on the shafts 40 and 37, respectively.

Occasionally a lump of dough becomes caught between the fingers 38 and chute 16 or 17, and sometimes a person's hand or clothing is caught by the transfer mechanism. In order to stop the rotation of said transfer mechanism in case of such an emergency, a connection is provided between the sprocket wheel 43 and the shaft 37 of the transfer mechanism which permits relative rotation between the sprocket wheel and said shaft in case the transfer mechanism meets with an obstruction which is sufficient to cause disengagement between the sprocket wheel 43 and shaft 37.

As shown, said connection comprises a collar 44 pinned to the shaft and engaging with the sprocket wheel 43 through a tapered rib 45 on an end face of the sprocket wheel which engages in a tapered groove 46 in an end face of the collar 44. The sprocket wheel 43 is yieldingly held against the collar 44 by a coiled compression spring 47 interposed between the sprocket wheel and a collar 48 adjustably mounted on the end of the shaft 37. Conveniently, the end of the shaft may be screw threaded and the collar 48 may be threadedly mounted thereon. By properly adjusting the collar with respect to the sprocket wheel, sufficient spring pressure may be applied to the sprocket wheel to maintain the driving connection between the sprocket wheel 43 and collar 44, but permitting the tapered rib to run out of the groove in case the distributor meets with an obstruction sufficient to overcome the force of the spring 47.

The distributor is driven in timed relation to the chain 6 and the buckets 7, so that the fingers 38 will also deliver the lumps of dough in time to roll into the buckets as they pass the lower ends of the chutes 16 and 17. It is to be observed that in case the transfer mechanism is stopped for any reason, the fingers 38 will resume their timed relation to the buckets 7 whenever the obstruction is cleared away and the driving connection between the sprocket wheel 43 and collar 44 is again established.

In the operation of the mechanism, the lumps of dough discharged from the rounder fall, one at a time, upon the distributor 12 and are discharged therefrom into the two chutes 13 and 14 in alternate fashion. As the lumps of dough pass the curtains 23 they are directed towards the middle of the chutes 13 and 14 and roll down to the lower end thereof where they are arrested by the fingers 29 and held back by said fingers until the fingers 38 of the transfer mechanism pick up the endmost lumps of dough and transfer them to the chutes 16 and 17 from which they roll into the buckets 7.

In case the lumps of dough are comparatively small in diameter, the fingers 29 are adjusted back into the chutes, so that the fingers 38 may pick up the endmost lumps of dough without picking up the next adjacent one. If the distributor meets with any obstruction, the resistance of which is sufficient to cause the tapered rib 45 to run out of the tapered groove 46 against the action of the spring 47, rotation of the distributor is arrested until the obstruction has been cleared away.

More or less variation of the exact details of construction is possible without departing from the spirit of this invention. I desire, therefore, not to limit myself to the exact form of the construction shown and described, but intend, in the following claims, to point out all of the invention disclosed herein.

I claim as new, and desire to secure by Letters Patent:

1. Loading apparatus for proofers comprising in combination a distributor, a pair of inclined chutes into which lumps of dough are alternately discharged from said distributor, and means depending crosswise in said chutes, said means having spaced end parts for deflecting the lumps of dough to the middle portions thereof.

2. Loading apparatus for proofers comprising in combination a distributor, a pair of inclined chutes into which lumps of dough are alternately discharged from said distributor, and curtains depending crosswise in said chutes, said curtains having open spaces for the passage of lumps of dough and weighted ends for deflecting the lumps of dough to the middle portions thereof.

3. Loading mechanism for proofers comprising in combination a distributor, a pair of inclined chutes into which lumps of dough are alternately discharged from said distributor, and curtains having weighted bifurcated lower ends depending in said chutes for deflecting the lumps of dough to the middle portions thereof.

4. In loading apparatus for proofers, the combination of a rotatable transfer drum having fingers extending therefrom disposed equi-distantly around the circumference thereof, a shaft for said drum, buckets travelling in timed relation to the fingers of said drum and adapted to receive lumps of dough discharged by said fingers from said drum, a shaft rotating in timed relation to said buckets, driving connections between said shafts for rotating the transfer drum in timed relation to said buckets and a slip clutch in said driving connections releasably responsive to the action of the transfer drum, said clutch having clutching means so co-ordinated with respect to said fingers as to automatically reclutch the clutch after being unclutched and thereby reestablished the timed relation between the fingers and the buckets.

FRED MARASSO.